United States Patent [19]

Vidal

[11] 4,371,346

[45] Feb. 1, 1983

[54] SYSTEM FOR PROPULSION OF BOATS BY MEANS OF WINDS AND STREAMS AND FOR RECOVERY OF ENERGY

[76] Inventor: Jean-Pierre Vidal, 2, place des Eglantines, 91540 Mennecy, France

[21] Appl. No.: 179,853

[22] Filed: Aug. 20, 1980

[30] Foreign Application Priority Data

Aug. 31, 1979 [FR] France .................................. 79 21904

[51] Int. Cl.³ ............................................ B63H 13/00
[52] U.S. Cl. ......................................... 440/8; 114/39; 416/132 B; 290/55; 440/86
[58] Field of Search ............... 440/8, 86; 114/39, 103; 74/645; 290/55; 416/132 B, 153; 417/334

[56] References Cited

U.S. PATENT DOCUMENTS

| | | | |
|---|---|---|---|
| 2,047,155 | 7/1936 | Rettman | 180/2 A |
| 3,000,447 | 9/1961 | Baugher | 416/153 |
| 3,887,048 | 6/1975 | Jahnel | 440/86 |
| 4,100,823 | 7/1978 | Krist | 74/645 |
| 4,276,033 | 6/1981 | Krovina | 114/103 |

Primary Examiner—Trygve M. Blix
Assistant Examiner—D. W. Keen
Attorney, Agent, or Firm—Karl W. Flocks; A. Fred Starobin

[57] ABSTRACT

The invention relates to an improved system for propulsion of boats by winds and streams and for recovery of disposable energy from floating stations neither moored nor anchored, the improved system comprising:
 at least one aerial feathered propeller with its shaft, the propeller being mounted orientable in any azimuth direction contained in a substantially horizontal plane and adapted to function as an aerogenerator as well as a propulsive screw;
 a superstructure supporting device on the floating unit adapted to permit orientation as desired of the aerial propeller in the direction of the wind;
 at least one nautic propeller screw with its shaft, mounted under the bottom of the floating unit and adapted to be capable of functioning as energy collecting turbine as well as propeller;
 a transmission system connecting the aerial propeller shaft to the nautic propeller shaft, the transmission being reversible and capable of including a torque conversion device to select during operations the direction of transmission as well as the transmission ratio;
 a directional device adapted to ensure the steering of the floating unit; and
 control devices comprising actuating apparatus adapted to allow the driver to act, in addition upon the directional device and the azimuth orientation of said aerial propeller, upon at least two of three variable parameters of said system, namely the pitch of said aerial propeller, the transmission ratio and the pitch of said nautic propeller, by the actuating apparatus.

11 Claims, 10 Drawing Figures

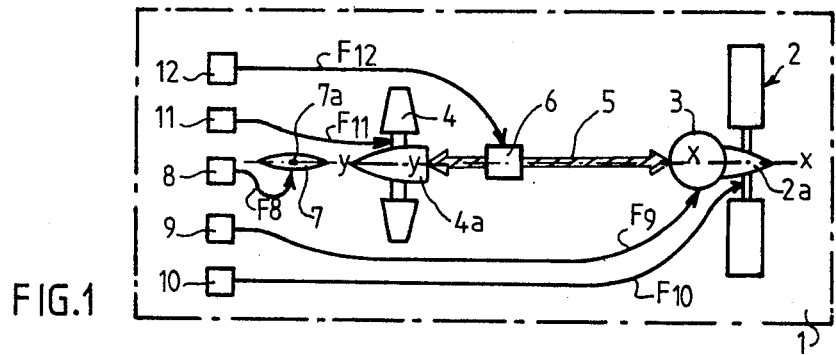
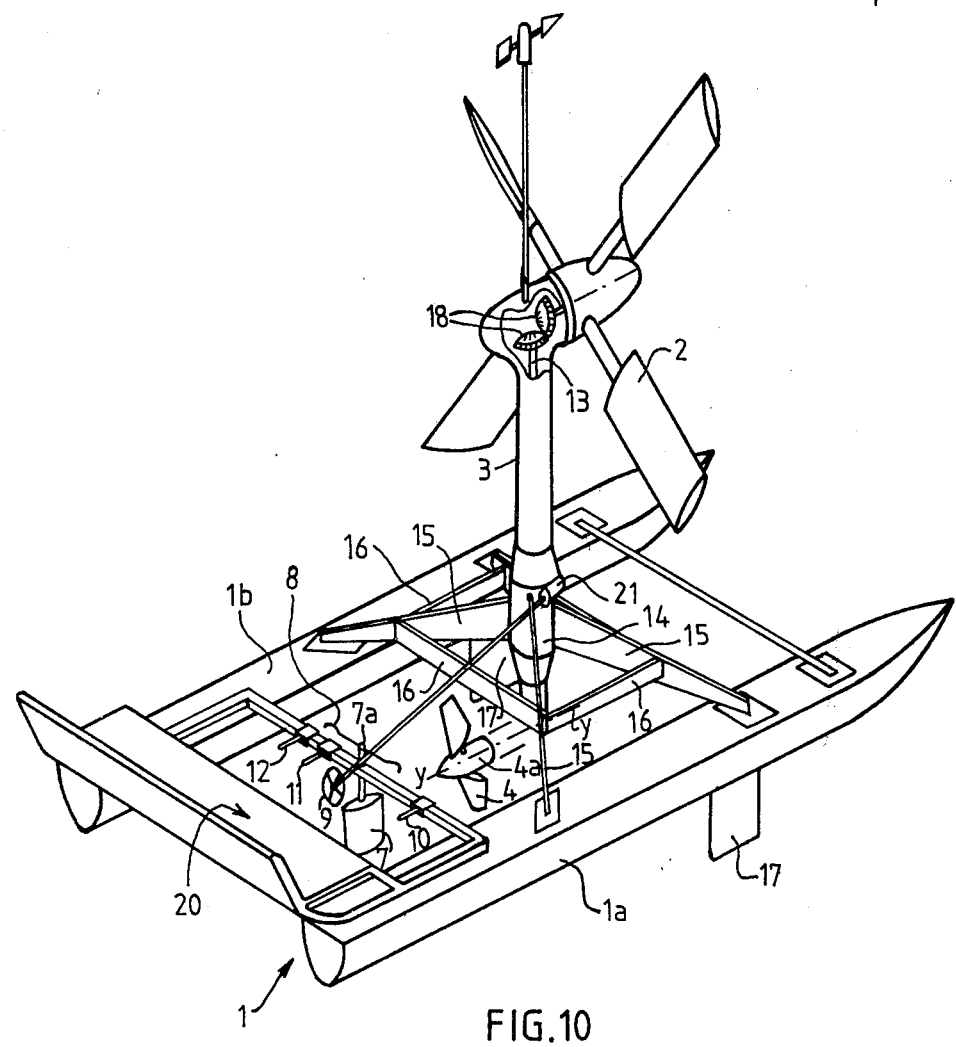

FIG. 3

SYSTEM FOR PROPULSION OF BOATS BY MEANS OF WINDS AND STREAMS AND FOR RECOVERY OF ENERGY

The present invention relates to an improved system to ensure propulsion and evolution of boats by using energy from water streams and winds. Such system also permits recovery of energy from winds and streams aboard floating stations which are neither moored nor anchored.

Sailing navigation uses energy from the wind by means of many types of sails which have in common basic limitations among which the following may be cited: impossibility of sailing facing the wind; when sailing before the wind, a maximum speed much lower than that of the wind; and, generally poor energetic efficiency.

In the XVIIIth century there seems to appear the idea of catching energy from the wind, not by means of sails but through windmills actuating rowing machines or paddle wheels for propulsion of ships.

Later on, more elaborate proposals and realizations have been tempted using orientable aerogenerators or wind engines mechanically connected to nautic propeller screws.

However, although the utilization of energy from wind for the propulsion of ships by means of rotary sails transmitting energy to nautic propellers had been known for a long time, as mentioned above in its basic principle, it has not found great developments.

Apparently, there are two essential reasons for such situation, namely, the methods used were not well adapted to the above-mentioned principle and some possibilities, though extremely interesting, have not appeared to be realizable and even credible on a physical basis.

Thus, as will be explained hereinbelow, among other advantages, navigations sailing facing the wind is perfectly possible and sailing before the wind permits to reach speeds higher than that of the wind.

Such possibilities are very interesting as to utilitarian transportation but also as regards sporting activities, the more so because at the present time significant efforts are being made to obtain from the usual static sails the extreme limit of their efficiency which seems already to be practically reached.

Therefore, in this period in which the price of energy is ever increasing, it appears to be proper to come back to the idea of using energy from winds for transportation, especially by sea and possibly on the ground.

This is the more true because energy from water streams was moreover up to the present time relatively little or badly used for transportation.

Thus, the main utilization consists essentially in exploiting the drift of the boat or the like driven by the stream. Other utilizations of the streams include guiding or reaction cables permitting for instance to cross river streams.

The combination of the force of the wind and the streams is also used but with very limited freedom as regards the shipping lane in respect to the axes of wind and stream as well as the speed control.

However, water streams are particularly interesting energy sources, since they appear less randomly than winds and can accommodate various situations. Moreover, their properties have been taken advantage of for a long time for application to fixed stations like water mills, hydroelectric dams, and so on.

The main object of the invention is the combined application of the action of the winds and of the streams to ensure not only propulsion and evolution of boats but also energy recovery from floating stations whether movable or stabilized by their own means, such stations being neither moored nor anchored.

In the particular case of recovery of re-usable energy, the latter results, as will be explained hereinafter in detail, from the relative motion between the two water and air phases, and this is the reason why no energy can be recovered when the vectors wind speed and stream speed in reference to a fixed mark related to the ground are equal. In that case only the system according to the invention is not operative for fundamental, not technical, reasons, for recoverying energy that can be used outside.

In any other cases the system according to the invention is adapted to collect usable energy, notably if there are simultaneously substantial stream and wind having however distinct vectors, such as, for instance, in the case of a substantial stream with almost no wind or in the case of a substantial wind with low or almost no stream.

Obviously, the energy recovered according to the invention can be used up or transported for any suitable utilization or else used for the propulsion of the floating craft on which the system of the invention is installed.

The improved system according to the invention is essentially characterized in that it comprises the combination of:
- at least one aerial propeller screw that can be set to variable pitch during operation and reversed during operation, said propeller being orientable in any azimuth direction contained in a substantially horizontal plane and adapted to function as an aerogenerator or propulsive screw, alternatively;
- a superstructure supporting device on the floating unit to permit orientation as desired of said aerial propeller in the direction of the wind;
- at least one nautic propeller screw that can be set to variable pitch during operation, mounted under the bottom of the floating unit and capable of functioning as energy collecting turbine or propeller alternatively;
- a transmission system connecting the aerial propeller shaft to the nautic propeller shaft, said transmission being reversible and capable of including a torque conversion device to select during operation the direction of transmission as well as the transmission ratio;
- a directional device of any known type to ensure the steering of the floating unit;
- and control devices for allowing the driver to act as desired, in addition to his action upon the directional device and the azimuth orientation of the aerial propeller, upon at least two of the three variable parameters of the system, namely, the pitch of the aerial propeller, the transmission ratio and the pitch of the nautic propeller, depending on the purpose to be served and the conditions of wind and sea to which the floating unit is submitted.

Other characteristics and advantages as well as distinctive features of this invention will appear from the following description accompanied by the attached drawing in which:

FIG. 1 is a diagram showing the fundamental principle on which the improved system according to the invention is based;

FIGS. 2 through 9 are diagrams for explaining the operation of the improved system according to the invention, submitted to different wind and stream conditions; and FIG. 10 is a perspective view of a sporting boat for carrying out the invention.

Figure 2:
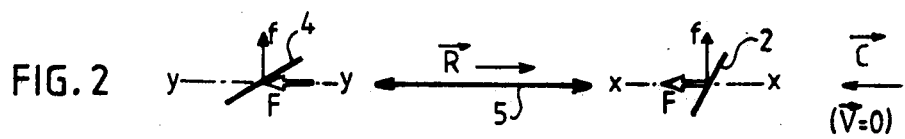

With reference to the diagram of FIG. 1, the system according to the invention which is installed on a floating unit represented by rectangle 1 substantially comprises:

at least one aerial propeller 2 having a substantially horizontal axis x—x and being orientable in any azimuth direction due to the fact that it is mounted at the upper end of a supporting pylon 3 rotatable about its longitudinal axis. This propeller is preferably provided with pitch variation and reversal means that can be actuated during the operation; such means is of any known type and is disposed in the housing 2a of the propeller. Finally, propeller 2 is of a type capable of alternatively functioning as an aerogenerator or a propulsive screw;

below the bottom of boat 1, at least one nautic propeller 4 having a substantially horizontal axis y—y and possibly provided with pitch variation means actuatable during operation and disposed in housing 4a;

a transmission advantageously of the mechanical type shown by the arrow 5 and connected between the shaft of the aerial propeller 2 and the shaft of the nautic propeller 4. Such transmission is of the reversible type and can be provided with a speed box or a torque conversion system denoted 6. It is to be noted as regards the operation that the same effect is obtained by providing either one of the two aerial or nautic propellers with a pitch reversal system or by providing the transmission with a device for reversing the torque transmission direction (rearward motion or reversal of motion);

a rudder 7 is mounted to the bottom of the boat 1, having its rotation axis 7a in the vertical plane containing axis y—y of the nautic propeller 4. A drift device (not shown) is also advantageously provided under the bottom of boat 1 in the same vertical plane containing axis y—y of nautic propeller 4. Obviously, one would not depart from the scope of the invention by suppressing the rudder and the drift device to render the nautic propeller 4 orientable in any azimuth direction to ensure proper steering of boat 1;

a control device assembly mounted for actuation by the pilot and represented on FIG. 1 by blocks and arrows, namely:

square 8 and arrow $F_8$ to control the orientation of the rudder 7;

block 9 and arrow $F_9$ to control the azimuth orientation of the aerial propeller 2;

block 10 and arrow $F_{10}$ to set the pitch of the aerial propeller and possibly its reversal;

block 11 and arrow $F_{11}$ to adjust the pitch of the nautic propeller 4 and possibly its reversal, and block 12 and arrow $F_{12}$ to set the amplitude of the transmission 5 ratio and possibly the direction of the transmission.

Figure 4:
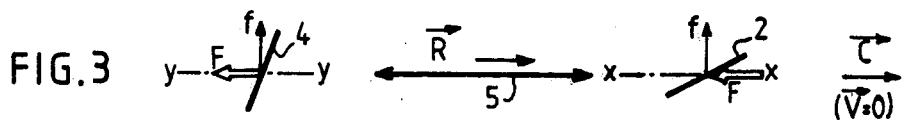
Figure 5:
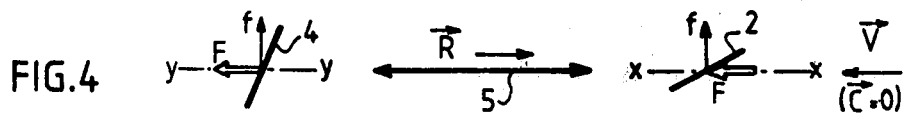

The functions and the utilization of the system according to the invention will now be described, after the above definition of the fundamental principle on which the combination is based, by referring first to the four basic limiting cases which are the following:

no wind, facing the stream (FIG. 2)
no wind, stream from behind (FIG. 3)
no stream, facing the wind (FIG. 4)
no stream, wind from behind (FIG. 5).

In all those limiting situations to be considered, both propellers whether aerial 2 or nautic 4 have respective axes x—x for the aerial propeller and y—y for the nautic propeller, which are made parallel by means of the orientation device 9-$F_9$, and are so maintained.

In order to permit better comprehension of the diagrams and to be able to compare them and to clearly show the setting and orientation means for the pitches and transmission, the following representations were adopted:

Each of the propellers is represented by the cross-sectional end of its upper blade, 2 for the aerial propeller and 4 for the nautic propeller, by its axis of rotation x—x for the aerial propeller and y—y for the nautic propeller, by its direction of rotation f for both propellers and by arrow F on the pressure blade for both propellers.

If arrow F is directed toward the blade it means that the corresponding propeller receives energy from the fluid in which it is immersed and transmits it by the torque and the rotation motion onto its shaft. If arrow F is counter-currently positioned in respect to the blade, it means that the corresponding propeller transmits energy to the fluid in which it is immersed; then, it has a propulsive function but this does not mean that it necessarily provides by that effect all the propulsion power.

For understanding the basic principle of those limiting cases it is not indipensable to dispose of all the pitch and transmission setting means mentioned above.

Thus, it will be assumed conventionally and only for simplifying the diagrams and explanation thereof that both propellers have variable pitches which are not necessarily reversible and that the mechanically reversible transmission does not comprise any torque conversion means or further means for reversing the direction of torque transmission (backward motion); it is a direct transmission.

The uninterrupted line 5 represents such desmodromic transmission between both propellers, the wind speed is represented by vectors $\vec{V}$, the speed of water stream is represented by vectors $\vec{C}$ and the speed of the boat with respect to the air when there is a stream in the absence of wind or with respect to water when there is wind in the absence of a stream, by vectors $\vec{R}$.

On FIG. 2 the nautic propeller 4 gets energy from the stream, the aerial propeller 2 communicates energy received via transmission 5 to the atmosphere. The axial resultant of the drag of hydraulic propeller 4 and hydrodynamic forces on the bottom are compensated for by the pressure from the aerial propeller 2 propelling in countercurrent direction and energy in excess is available for the propulsion subject to suitable setting of the propeller pitches. As a matter of fact, pitch positions can be found such that the torques of both propellers are opposite and balanced. In that case, the transmission transmits the torque but no energy because it does not rotate. Then the boat drifts in the stream and is slightly braked by the drag in the air of the aerial propeller. The balance can be broken by acting upon the pitch of either of the propellers or both of them.

These actions consist of acting upon the nautic propeller 4 to increase the pitch and upon the aerial propeller 2 to diminish the pitch. In that case the torque of the nautic propeller 4 increases so as to drive the aerial propeller 2 which thus becomes propulsive. As the propellers take speed the pitch of the nautic propeller 4 can be reduced and the pitch of the aerial propeller 2 increased progressively and moderately.

If variations of pitch from the balanced position of the torques had been effected in the direction reversed to that mentioned above i.e. in the direction to diminish the pitch of nautic propeller 4, and increase the pitch of aerial propeller 2, both propellers would rotate in the reverse direction of arrows f and the boat would progress in the direction of the stream. This utilization is represented on FIG. 3 with respect to a stream that changes its direction.

According to FIG. 3 the stream exerts direct push on the nautic propeller 4 which has a relatively low pitch; the boat tends therefore to drift in the stream. The aerial propeller 2 which has a relatively high pitch is driven into rotation under the effect of the relative wind in the direction f and receives significant torque transmitted to the nautic propeller 4 which rotates in the propulsive direction, with the resulting force thereof adding itself to the direct push from the stream. The system has then the effect of increasing the push from the stream and thus the energetic efficiency. This system being sufficiently dimensioned in respect to the boat and realized in accordance with the technical rules in such domain and as regards mechanical transmission efficiency, the so equiped and utilized boat can reach a speed higher than the stream.

FIGS. 4 and 5 are similar to FIGS. 2 and 3 but the functions of the propellers have been respectively changed.

On FIG. 4 the aerial propeller 2 gets energy from the facing wind, the nautic propeller 4 is propulsive and moves the boat in the reverse direction with respect to the wind. A balanced position between the opposite torques of both propellers can be obtained as was mentioned above in respect to FIG. 2. The setting of the pitch must be such that the torque of the aerial propeller 2 in the direction f is sufficiently high; it drives the nautic propeller 4 in the direction f and this propeller is then propulsive.

When speed increases it is favourable to reduce the pitch of the aerial propeller 2 and increase the pitch of nautic propeller 4, in moderate proportions.

On FIG. 5 the aerial propeller 2 set to a low pitch receives direct pressure from the wind. Under the effect of drift the nautic propeller 4 gets pressure resulting from the relative water speed thereby producing a stream in the direction f. The nautic propeller 4 is set to high pitch at the start so as to drive the aerial propeller 2 in the propulsive direction by a sufficient torque.

As the speed of the rotary members and the boat increase the pitch of aerial propeller 2 can be increased while the pitch of the hydraulic propeller 4 is moderately reduced.

In all cases the speed of the boat can be controlled by control of the pitches and the maximum speed is aimed at by varying the setting of the pitches with due respect to the parameters of construction and of utilization such as stream speed and wind speed and load. Zero speed and thus a substantially fixed position can also be easily obtained by putting the boat in one of the situations in which there is facing wind or facing stream by diminishing the pitch of the propulsive propeller and increasing the pitch of the other so as to reduce the propulsive power to the amplitude just required for balancing the drags and the drift forces.

The mechanical transmission 5 was thought of in the diagrammatic examples shown as being direct and invariable but as was already stated above it might comprise a speed box or a system for converting the torque. The conversion of torque and motion connected thereto can produce a complementary effect in addition to the effects from the pitch variations intended above on the one hand, and on the other hand, favour the increase of the rotation speed of the energy collecting propeller the efficiency of which is better at a relatively high speed. However, the propeller that transmits energy to the medium should not have too high a speed so as to reduce mechanical losses and prevent cavitation occurrence in the case of the nautic propeller and sonic regimes at the end of the blade in the case of the aerial propeller.

According to the system of this invention any other directions of progression are equally possible.

Figure 6:
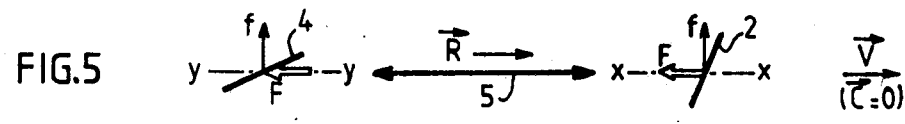

According to FIG. 6 which contains the same conventional notations as FIGS. 2-5 a cross wind compounded with the boat speed produces an apparent wind according to which the axis x—x of the aerial propeller 2 is directed. The aerial propeller 2 gets energy and transmits the torque directed according to f to the nautic propeller 4 driven in the direction f, it is then propulsive. FIG. 6 corresponds to one case, in the absence of stream.

The axial drag of the aerial propeller 2 and the drift forces upon the boat can then be compensated for by the usual devices such as drift means which can be retractable, correction by rudder or orientation of the nautic propeller 4.

Also in the case of a zero stream and little wind different from no wind at all, the change of heading of the boat can be effected with the usual steerage means by maintaining the axis of the aerial propeller 2 in the axis of the apparent wind by means of the mentioned orientation system. However, when arriving as the case may be in a position substantially wind from behind from for instance a leading wind, the device is not in a configuration shown on FIG. 5 because the aerial propeller 2 gets energy without having the advantageous propulsive function mentioned above. It is then that there is intervention of the reversal of pitch of one propeller or reversal of the direction of transmission which have been mentioned above and then the setting of the pitches, also as mentioned above, is effected.

Another type of operation which however has disadvantages enables suppression of the pitch or transmission reversal means. It consists of using the device for orientation of the aerial propeller 2 by varying the azimuth thereof by half a turn during the transition from a leading to a rearward wind.

A similar functioning can be obtained when using the stream in the absence of wind.

Figure 7:
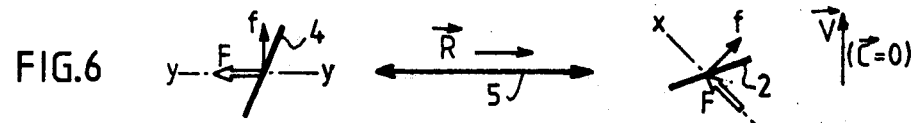

According to the diagram of FIG. 7, in the absence of wind a stream is received transversely of the course followed. The apparent stream resulting from the compounding of the boat speed and the actual stream acts in the axis y—y of the nautic propeller 4 receiving energy. In this position the aerial propeller 2 is propulsive. The pitches are set in accordance with the teachings above so that the nautic propeller 4 provides sufficient torque to drive the aerial propeller 2 via the transmission. A drift occurs by the effect of the stream upon the propeller and the bottom of the boat; it can be compensated for by controlling the rudder acting close to a position situated in accordance with the apparent stream.

To obtain maximum efficiency in this type of functioning the bottom of the boat should preferably be little directive so as to offer little resistance to a stream in the lateral direction.

It will be clear now that in certain cases when the streams are used such latter characteristic is not indispensable.

The utilization of combined winds and streams is based upon an analysis in the particular situation by considering the vector wind, the vector stream and the course to follow. Such analysis can be supported by the decomposition of the situations in respect to the six typical cases mentioned above.

Certain situations characterized by a wind, a stream and a shipping lane determined in their relative positions also constituted particular limit cases.

It has been noted above that when the stream and the wind have substantially equal vectors the system of the present invention cannot operate since only one course is possible, the one which results from the drift. This is also the case for the usual sailing boat.

Figure 8:
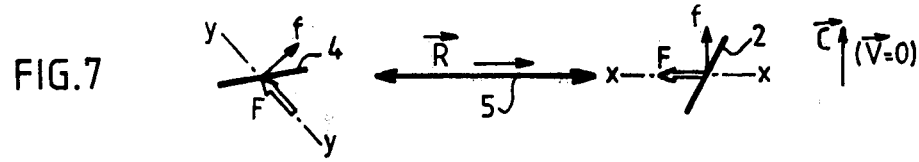
Figure 9:
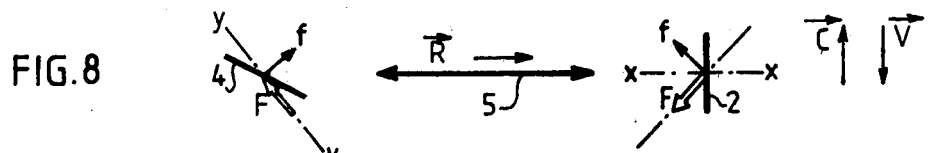

However, a favourable case is that of a stream having a direction substantially opposed to the wind. In order to follow a course opposed to the wind the boat must be placed in a configuration similar to FIG. 2 so as to benefit moreover from the direct push from the wind as illustrated on FIG. 5. In order to follow a course opposed to the wind the boat will be placed in a configuration similar to FIG. 4 so as to benefit moreover from the direct push of the stream such as illustrated on FIG. 3. In the same case but to follow a direct substantially perpendicular to the axis of the wind and the stream the necessary energy can be taken from one of the fluids and transmitted to the other according to two possible configurations as shown on FIGS. 8 and 9.

Obviously, the most advantageous of those configurations will be selected; it depends on the speed of both media, the characteristics of the boat and the form of embodiment of the device.

It is favourable in said two situations that the bottom is little directive and that the nautic propeller 4 is orientable in any azimuth directions if the maximum performance is intended.

It will be easy to determine intermediary configurations corresponding to courses of any kind on the condition that the axes of the propellers are respectively disposed according to the apparent speed of the wind and the stream.

In the most general case the components of the vectors wind and stream on the axis of the source to follow will have been considered. If these components are substantially equal the direction opposed to them or approximate directions are not favourable. The energy is taken from which of the media permits to obtain maximum energy as compared to the other, with the respective propeller. The other propeller obviously takes a propulsive function.

If the components of the vectors are opposed the situation is more favourable, the propeller which receives the energy-collecting function is that of which the fluid medium has a vector opposed to the course to follow. The other propeller then receives a propulsive function.

The dimensioning of the propellers is made in close dependence on the size of the boats considered in accordance with the rules in this technical field in respect to the various functions intended, the aerial propeller 2 being propulsive or an aerogenerator and the nautic propeller 4 being propulsive or an energy collecting turbine. The same applies to the mechanical transmission means which must have good energetic efficiency.

The system of the present invention may take various applications and be embodied differently depending on the intended degree of specialization.

Some of those forms of embodiment the number of which is not limitative are described as examples hereinbelow.

According to a specific form of embodiment of the present invention it is possible to cross a river by means of a boat or ferry comprising the following system: a boat is provided with at least one nautic propeller 4 functioning as an energy collecting turbine from the river stream. The axis y—y of said propeller is oriented facing the wind. The shaft of the propeller is mechanically connected to a propulsive aerial propeller 2. The latter has a rotation axis x—x substantially parallel to the axis of the nautic propeller and its propulsive power resulting from its rotation controlled by the transmission is directed in the reverse direction of the stream due to proper setting of the pitch.

The boat is provided with at least one rudder the central position of which is the vertical plane of the axis of the nautic propeller 4. A vertical drift is disposed under the bottom in this same plane. The axes of the propellers are not necessarily orientable in azimuth; the aerial propeller 2 is having a variable pitch during the operation.

The wind is assumed to be of zero or little amplitude since in the contrary case the fundamental principles mentioned above and the limitations resulting therefrom should then be taken into account.

The functioning of the system is the following:
the boat is moored to its starting position on one of the banks such that the axes of the propellers are disposed according to the stream and with the orientation corresponding to their above defined functions,
the pitch of aerial propeller 2 is set to ensure sufficient propulsive power to compensate for the drift forces resulting from stream actions,
the boat is freed from its mooring and its evolution in the stream is controlled by the rudder and the setting of the pitch of the aerial propeller 2 which is propulsive,
a motion perpendicular to the bed of the river is obtained by orientation of the assembly due to control from the rudder such that the fixed drift receives from the stream forces substantially directed to the opposite bank. By setting the pitch of the aerial propeller 2 the boat is maintained in the neighbourhood of the straight line defined by the centers of the two stations on banks,
an auxiliary motor can be provided to be used in disadvantageous situations caused in particular by substantial wind in the direction of the stream.

In such a form of embodiment the boat can present a flat hull offering a large loading area.

In another particular form of embodiment of this invention the boat is equipped with a system permitting to progress in a direction of a stream of water upwards or downwards. The system is mechanically similar to that exposed in the previous case above, it being noted however that the boat is of a different shape. As a matter of fact, this boat is preferably elongated and the propellers have substantially parallel axes directed according to the larger axis of the boat.

Starting from a situation similar to that defined in the previous case, by setting the pitch of the aerial propeller, the motion of the boat can be produced by moving up or down the stream. If good performances in the direction downstream should be obtained a configuration similar to that schematically shown on FIG. 3 must be adopted. Then the system must be provided with a device for setting the pitch of the nautic propeller and the conversion of the torque on the transmission.

The motion downstream is then produced in accordance with the functioning described above with reference to FIG. 3 so that the direction of rotation of the propellers is reversed if the orientation of the boat is not changed from the counter-current progression to the co-current progression. The functions of the propellers are then changed, with the nautic propeller receiving a propulsive function added to that of the stream and the aerial propeller functioning as an aerogenerator.

The transverse motion in respect to the water stream can occur in accordance with the operational steps defined in the previous example.

Higher performances in transverse motion can be obtained by such a system provided moreover with an azimuth orientation system for the aerial propeller in accordance with the operational steps defined above thereby also presenting the advantage of better taking into account the winds when these are substantial.

In another particular application of the present invention a system similar to that exposed above in both previous realizations is mounted aboard a floating platform having however this difference that energy is taken in significant quantity from one of the two propellers. Dimensioning of the propellers is calculated as a function of the conditions of exploitation including production of energy, thus rendered possible on a movable station which can be disposed either in a stream or in a zone swept by the winds and clear, for instance, in the open sea.

The operation is mainly ensured in accordance with one of the configurations 2 or 4, depending on whether a stream or a wind is exploited.

The propeller taking a propulsive function is then set so as to only ensure stabilization of the station at a low or zero speed. In the case of a stream such stabilization also provides for the use of at least a rudder. In the case of wind exploitation a movable vertical plane can be used for stabilization.

The settings of the pitch and transmission are effected so as to obtain maximum of energy which can detected by means of a power metering instrument and the control actions are effected in accordance with the result of the measure. Regulation and servo-control means are advantageously used to stabilize the station and obtain optimization of the energy recovery.

From energetic point of view, the ideal case is that of a site which often meets substantially opposed stream and wind. In that case, both propellers simultaneously take an energy receiving function thereby implying reversal of the direction of transmission between both propellers, starting from one of the configurations mentioned in accordance with FIGS. 2, 3, 4 or 5 or reversal of one of the pitches. The settings of the pitch and transmission are intended for obtaining compensation for the drift forces of the station by increasing the axial drag, by the reduction of the pitch of the corresponding propeller, which tends to exert itself in the reverse direction to the noted drift.

This form of embodiment could advantageously comprise motor-generators on each propeller rather than a direct mechanical transmission between the aerial and nautic propellers. Part of the energy is than used to stabilization by supplying energy to the motors of the propellers which take if need be a propulsive function.

Specialized forms of embodiment can be realized at will as a function of the intended application and the site of utilization, for instance, alternative or simultaneous exploitation of winds and streams, exploitation of a stream only, exploitation of a wind only, open sea site, water stream or strait . . . exploitation of slow speed streams, and so on.

In any case, the advantage afforded by the system of the invention is to permit suppression of the mooring thereby eliminating pulling cables and constructions which impede navigation and present many further drawbacks. Moreover, the station can be used on such site on which the moorings and constructions would be difficult or practically impossible. Furthermore, the station can also be movable within certain limits by its own means.

The energy produced can be used on the floating station, for instance, a factory ship or transported through electric cables, for example, deposited on the ground.

Another form of embodiment relates to a sporting boat which has the following advantages: facility of manoeuvering whatever the winds and streams so that it becomes possible in a certain degree to eliminate the need for an auxiliary engine for entering and exiting harbours, exploitation of the streams (which, on the contrary, are mostly troublesome to sailing boats), navigation in any azimuth, high performances with facing winds as well as against the winds, for instance, on a river, much higher performances than those of the sailing boat with wind from behind or co-currently.

FIG. 10 represents a possible form of realization of such an application. Boat 1 has preferably several hulls and is for instance of the "catamaran" type.

The aerial propeller 2 may function as an aerogenerator or a propeller; to this end it comprises means for setting and reversing the pitches, and the blades of such propeller can work with both faces; their cross-section can be symmetrical with respect to their central plane. The hydraulic propeller 4 must be capable of functioning alternatively as a receiving turbine or a propeller. It may be adapted to have variable or fixed pitch of a large amplitude. Transmission 5 is mechanical and comprises a speed unit or torque conversion means which if the nautic propeller 4 has variable pitch are not indispensible while being favourable.

The aerial propeller 2 is orientable in any azimuth by rotation of a supporting pylon 3 about a substantially vertical axis which comprises a coaxial transmission shaft 13. Such pylon 3 is secured to the boat 1 through roll bearings disposed in a broadened base portion 14 itself secured to both hulls 1a and 1b through supporting arms 15 reinforced by bracings 16. The axis y—y of the nautic propeller 4 which is stationary with respect to the boat, a drift on each responsive hull 17 and a rudder 7 are mounted in the vertical axial plane of the boat as regards the propeller and in the vertical axial plane of each hull 1a, 1b as regards the drifts 17.

The transmission is successively ensured by a pair of conical gears between the shaft of the aerial propeller and the shaft of transmission in the axis of the supporting pylon of the propeller, another pair of conical gears (not shown) between the transmission shaft and the shaft of the nautic propeller.

A control station 20 arranged for instance on the stern of the boat permits centralization of all controls: for instance, steerage means, actuated by the foot or a bar 8, setting of the pitch of the aerial propeller 2 and reversal by means of a lever 10; if need be, setting of the pitch and reversal of the pitch of the nautic propeller 4 by another lever 11, control of the speed box by a lever 12.

Such a speed unit or box could include for instance a constantly meshing gearing of the cycloid type, with adjustment of the orientation of the aerial propeller by means of a crank 9, transmitting the rotation to the substantially vertical supporting pylon 3 of the aerial propeller 2 by a mechanically non reversible screw and toothed gear ring system 21 to compensate for the reaction torque of the transmission.

The control are relatively numerous but they are centralized as compared to the usual sailing boats where many movements are frequently required.

At a predetermined point of sailing, with the settings being effected correctly, in accordance with the above defined rules, the main control is the rudder 7 by means of which the head and the course are maintained. In the event of the change of one of the factors or the course, the new head is reached by manoeuvering the rudder together with the other settings intended to hold propellers 2 and 4 in the above defined normal conditions of use.

The so defined control station permits to ensure from a single location on the boat the execution of any control and the optimization of the settings for searching the best performances.

The possibility of controlling in a simple way the organs of the system according to the present invention favours the use of automatic pilot means. The orientation of the aerial propeller 2 can then be controlled not by a screw system 21 which is switched off but by servo means responsive to tail-planes. The rudder 7 can be servo-controlled to any factor permitting either to hold a course or a head or the evolution thereof in respect to the wind or stream, or for instance a compass.

Other settings such as those for pitches can include servo-control means, optimization means or self-regulation.

It will be understood that the present invention was only described and represented in preferred exemplifying forms of embodiment and that equivalents can be substituted for its constitutive elements without departing from its scope which is defined in the appended claims.

I claim:

1. An improved system for propulsion of a floating unit of the boat type, by means of winds and streams and for recovery of disposable energy from floating stations neither moored nor anchored said improved system comprising mounted on said floating unit:
   a superstructure supporting device and, on said structure;
   at least one aerial feathered propeller having a substantially horizontal shaft and provided at the upper end of a supporting pylon rotatable about its longitudinal axis;
   pitch variation and reversal means actuating on said aerial propeller;
   means for controlling the rotation of said pylon and the azimuth orientation of said aerial propeller;
   below the bottom of said floating unit, at least one nautic propeller screw having a substantially horizonal shaft;
   pitch variation means actuating on said nautic propeller screw;
   a transmission system connecting said aerial propeller shaft to said nautic propeller shaft for transmitting the mechanical energy from said nautic propeller to said aerial propeller or from said aerial propeller to said nautic propeller and including a toruqe conversion means for selecting, during operations, the transmission ratio;
   means for reversing the relative rotation direction of said aerial and nautic propellers to facilitate a change of function respectively from an aerogenerator to a propulsive function for said aerial propeller and from a propulsive to an energy collecting turbine function for said nautic propeller;
   a directional means for insuring the steering of said floating unit and
   control devices comprising means actuating in addition upon said directional means, said azimuth orientation of said aerial propeller and said rotation directions, upon at least two of three variable parameters of said system, namely the pitch of said aerial propeller, the transmission ratio and the pitch of the nautical propeller.

2. An improved system according to claim 1, wherein at least one of said aerial propeller, said nautic propeller and transmission system comprises means for reversing the pitch of one of said propellers with respect to the other and means for reversing the driving of one propeller with respect to the other by means of said transmission system.

3. An improved system according to claim 1 wherein, for the boat propulsion without wind and facing the stream, the pitch of said nautic propeller and the other control means and of said aerial propeller and the other control means are adapted in order that said nautic propeller and the other control means receives the stream energy and that said aerial propeller and the other control means transmits the received energy by means of said transmission system to the atmosphere and has a propulsive function.

4. An improved system according to claim 1 wherein, for the boat propulsion without wind and with a stream from behind, the pitch of said nautic propeller and the other control means and of said aerial propeller and the other control means are adapted in order that said aerial propeller and the other control means rotates under the action of the relative wind due to the drift of said boat by said stream and is actuated by an important torque which is transmitted to said nautic propeller and the other control means which rotates in the propulsive sense the resulting action of which adding to the direct stream pressure whereby the speed of the boat is higher than that of said stream.

5. An improved system according to claim 1 wherein, for the boat propulsion with no stream and facing the wind, the pitch of said aerial propeller and the other control means and of said nautic propeller and the other control means are adapted in order that said aerial propeller and the other control means receives the wind energy and that said nautic propeller and the other control means imparts the energy transmitted by said transmission system to the liquid medium and has a propulsive function.

6. An improved system according to claim 1 wherein, for the boat propulsion without stream and with wind from behind, the pitch of said nautic propeller and the other control means and of said aerial propeller and the other control means are adapted in order that said aerial propeller and the other control means receives the direct pressure of the wind and that said nautic propeller and the other control means receives pressure resulting from the relative speed of the stream and gives rise to a torque which is transmitted to said aerial propeller and the other control means whereby the latter rotates with a propulsive function.

7. An improved system according to claim 1 wherein, for the boat propulsion with wind abeam and without stream, said shaft of said aerial propeller is directed in the sense of the apparent wind resulting from said wind abeam and the speed of the boat and the pitch of said aerial propeller is adapted to be driven and the pitch of said nautic propeller is adapted to be propulsive.

8. An improved system according to claim 1 wherein, for the boat propulsion with stream abeam and without wind, said shaft of said nautic propeller is directed in the sense of the apparent stream resulting from the speed of said boat and the true stream and the pitch of said nautic propeller is adapted to be driven and the pitch of said aerial propeller is adapted to be propulsive.

9. An improved system according to claim 1 wherein, for the boat propulsion in a transverse direction with respect to a wind abeam and a stream abeam, said nautic propeller is oriented facing the stream and its pitch is adapted to be driven and said aerial propeller is oriented in a direction essentially parallel to that of said nautic propeller and its pitch is adapted to be propulsive in a sense opposite to that of the stream.

10. An improved system according to claim 1 wherein, for the boat propulsion in a transverse direction with respect to a facing wind and a stream abeam, said aerial propeller is oriented facing the wind and its pitch is adapted to be driven and said nautic propeller is oriented essentially parallel to that of said aerial propeller and its pitch is adapted to be propulsive in a sense opposite to that of the wind.

11. An improved system according to claim 1 wherein, for recovery of the energy of floating device, either in the stream or in the wind or in an area under the action of a stream and a wind acting opposite directions, the pitch and direction of each of said aerial and nautic propellers and the other control means are adapted in order that propeller and the other control means which is mainly concerned is driven and the other is propulsive just for ensuring a simple stabilizing function or both propellers and the other control means are driven and the pitch of each of them and the other control means are adapted to compensate for the drift forces resulting from stream actions with increasing the axial trail in decreasing the pitch of the corresponding propeller and the other control means acting in the sense opposite to said drift forces.

* * * * *